United States Patent
Sahu et al.

(10) Patent No.: US 12,476,884 B2
(45) Date of Patent: Nov. 18, 2025

(54) SYSTEM AND METHOD FOR WEB SERVICES RELOCATION AND USERS REALLOCATION FOR DATA RESIDENCY COMPLIANCE

(71) Applicant: Tata Consultancy Services Limited, Mumbai (IN)

(72) Inventors: Pankaj Kumar Sahu, Pune (IN); Sutapa Mondal, Pune (IN); Mangesh Sharad Gharote, Pune (IN); Sachin Premsukh Lodha, Pune (IN); Rishabh Kumar, Pune (IN); Shubhro Shovan Roy, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 213 days.

(21) Appl. No.: 18/414,217

(22) Filed: Jan. 16, 2024

(65) Prior Publication Data
US 2024/0314049 A1    Sep. 19, 2024

(30) Foreign Application Priority Data

Mar. 16, 2023  (IN) .............................. 202321017889

(51) Int. Cl.
*H04L 41/5041* (2022.01)
*H04L 41/5025* (2022.01)
*H04L 67/50* (2022.01)

(52) U.S. Cl.
CPC ...... *H04L 41/5045* (2013.01); *H04L 41/5025* (2013.01); *H04L 67/50* (2022.05)

(58) Field of Classification Search
CPC . H04L 41/5045; H04L 41/5025; H04L 67/50; H04L 41/0897; H04L 43/0852; H04L 41/5009; H04L 41/5019; H04L 41/5096; G06F 2209/5015; G06F 2209/506; G06F 2209/508; G06F 9/4875; G06F 9/5033; G06F 9/5072; G06F 9/5083
USPC ......................................................... 709/231
See application file for complete search history.

(56) References Cited

U.S. PATENT DOCUMENTS

| | | | |
|---|---|---|---|
| 9,367,257 B2 | 6/2016 | Hamilton et al. | |
| 10,795,583 B2 * | 10/2020 | Yang | G06F 3/0605 |
| 10,877,789 B2 * | 12/2020 | Ohnishi | G06F 9/45558 |
| 11,134,013 B1 * | 9/2021 | Allen | G06F 9/5072 |

(Continued)

*Primary Examiner* — Karen C Tang
(74) *Attorney, Agent, or Firm* — FINNEGAN, HENDERSON, FARABOW, GARRETT & DUNNER LLP

(57) ABSTRACT

The embodiments of present disclosure herein address the need of minimizing web services relocation and user centers reallocation to comply with data residency regulations and change in latency threshold for web services based on user demands. The method and system provide a framework that assists enterprises in migrating web services and user center allocation to different data centers with lower additional operational cost from its current configurations and minimal changes (migrations). In case of change in data regulations and invocation frequency from users demand, non-compliant users are allocated to compliant data centers with minimal changes in the original configuration. Though the key decision is to serve the customers effectively, web services need to be deployed across a finite number of servers, there are multiple sub-problems such as minimizing latency and reduction in operational cost that needs to be addressed.

18 Claims, 10 Drawing Sheets

(56) References Cited

U.S. PATENT DOCUMENTS

| | | | |
|---|---|---|---|
| 11,336,519 B1 | 5/2022 | Greenwood et al. | |
| 2017/0109205 A1* | 4/2017 | Ahuja | G06F 9/5094 |
| 2020/0014609 A1* | 1/2020 | Hockett | H04L 67/1001 |
| 2020/0310886 A1* | 10/2020 | Rajamani | G06F 9/45558 |
| 2021/0255884 A1* | 8/2021 | Van Rotterdam | H04L 67/10 |
| 2022/0014963 A1* | 1/2022 | Yeh | H04W 28/0268 |
| 2022/0116289 A1* | 4/2022 | Ramanathan | H04L 41/5051 |
| 2022/0335340 A1* | 10/2022 | Moustafa | G06N 20/00 |
| 2022/0350911 A1 | 11/2022 | Singi et al. | |
| 2022/0357869 A1* | 11/2022 | Salamon | G06F 11/3075 |
| 2022/0413708 A1* | 12/2022 | Canepa | G06F 3/0611 |
| 2024/0143372 A1* | 5/2024 | Currid | G06F 9/45558 |
| 2024/0205165 A1* | 6/2024 | Smith | H04L 41/16 |

\* cited by examiner

SYSTEM AND METHOD FOR WEB SERVICES RELOCATION AND USERS REALLOCATION FOR DATA RESIDENCY COMPLIANCE

CROSS-REFERENCE TO RELATED APPLICATIONS AND PRIORITY

This U.S. patent application claims priority under 35 U.S.C. § 119 to Indian Application number 202321017889, filed on Mar. 16, 2023. The entire contents of the aforementioned application are incorporated herein by reference.

TECHNICAL FIELD

The disclosure herein generally relates to the field of data placement in cloud and more specifically, to a method and system for minimizing migration of user centers as well as web services to data centers to comply with data residency regulations and quality of service.

BACKGROUND

Enterprises deploy number of web services over internet to serve thousands of customers distributed globally. With massive rise in number of users, web services, and volume of data, enterprises are adopting cloud over physical servers. Cloud Service Providers (CSPs) offer computational resources based on pay per use model which helps customers to save costs. The costs for web service deployment, data storage, processing and transfer vary across different CSPs, and data centers of the same CSP at different locations. This makes selection of CSPs and data centers challenging.

Enterprise needs to deploy several web services at multiple data centers to serve their customers satisfactorily. The selection of web service locations to serve geographically distributed customers significantly impacts Quality of service (QOS). Deploying a web service closer to each data subjects (user centers) improves the service response time, however hosting web services at multiple locations increases operational cost. The problem of locating multiple web services and user centers at different data centers with minimum deployment cost and ensuring low network latency, is referred as a Web Service Location Allocation Problem (WSLAP). The WSLAP is a challenging combinatorial multi-objective optimization problem.

To be Data Residency (DR) compliant, enterprise needs to review their web services location allocation decisions. The current allocation of user centers to data centers for accessing the web services may not be DR compliant. The enterprise may need to make alteration in their current data placement strategy, to avail the benefits of the new service offerings made by CSPs or cater services to new user centers, or to be DR compliant. To accommodate these changes, multiple options could exist like to host web services in already rented data centers or opt for new data center locations or make new contract with CSPs. However, making drastic changes from the original setup could include higher costs and hence, the enterprise may prefer to re-allocate with minimal migration and minimal operational cost.

SUMMARY

Embodiments of the disclosure present technological improvements as solutions to one or more of the above-mentioned technical problems recognized by the inventors in conventional systems. For example, in one embodiment, a method and system for minimizing migration of user centers as well as web services to data centers to comply with data residency regulations and quality of service is provided.

In one aspect, a processor-implemented method for minimizing migration of user centers as well as web services to data center to comply with data residency regulations and quality of service is provided. The processor-implemented method includes one or more steps such as receiving an information of one or more user centers, one or more data centers managed by one or more cloud service providers, allocation of one or more web services to the one or more data centers, a set of data residency regulations, a deployment cost between web services and data centers, an invocation frequency between user centers and web services, a latency between user centers and data centers, and a predefined service level agreement (SLA) for latency of each web service. Further, the processor-implemented method comprising analyzing the allocation of each of the one or more user centers and each of the one or more web services to one or more data centers to identify a non-compliance to the set of data residency regulations and a change in a predefined latency threshold for web services based on one or more user demands.

Furthermore, the processor-implemented method comprising determining an impact on the one or more user centers and on the one or more web services based on the non-compliance to the set of data residency regulations and the change in a predefined latency threshold for web services based on one or more user demands. Further, the processor-implemented method identifying at least one of the one or more data centers which are compliant to the data residency regulations and compliant with the predefined latency threshold for web services based on one or more user demands and migrating either the impacted one or more user centers, or the impacted one or more web services to the identified at least one of the one or more compliant data centers. Finally, the processor-implemented method comprising minimizing number of migrations of the one or more user centers and the one or more web services based on the invocation frequency, the deployment latency, and the predefined cost of deployment, wherein an increase in the invocation frequency increases the deployment latency for the one or more web services.

In another aspect, a system for minimizing migration of user centers as well as web services to data center to comply with data residency regulations and quality of service is provided. The system includes an input/output interface configured to receive an information of one or more user centers, one or more data centers managed by one or more cloud service providers, allocation of one or more web services to the one or more data centers, a set of data residency regulations, a deployment cost between web services and data centers, invocation frequency between user centers and web services, latency between user centers and data centers, and a predefined service level agreement (SLA) for latency of each web service, one or more hardware processors and at least one memory storing a plurality of instructions, wherein the one or more hardware processors are configured to execute the plurality of instructions stored in the at least one memory.

Further, the system is configured to analyze the allocation of each of the one or more user centers and each of the one or more web services to one or more data centers to identify a non-compliance to the set of data residency regulations and a change in a predefined latency threshold for web services based on one or more user demands to determine an impact on the one or more user centers and on the one or more web services based on the non-compliance to the set of data residency regulations and the change in a predefined latency threshold for web services based on one or more user demands. Furthermore, the system is configured to identify at least one of the one or more data centers which are compliant to the data residency regulations and compliant with the predefined latency threshold for web services based on one or more user demands. The system is configured to migrate either the impacted one or more user centers or the impacted one or more web services to the identified at least one of the one or more compliant data centers. Finally, the system is configured to minimize number of migrations of the one or more user centers and the one or more web services based on an invocation frequency, a deployment latency, and a cost of deployment, wherein an increase in the invocation frequency increases the deployment latency for the one or more web services.

In yet another aspect, one or more non-transitory machine-readable information storage mediums comprising one or more instructions which when executed by one or more hardware processors cause a method for minimizing migration of user centers as well as web services to data center to comply with data residency regulations and quality of service is provided. The processor-implemented method includes one or more steps such as receiving an information of one or more user centers, one or more data centers managed by one or more cloud service providers, allocation of one or more web services to the one or more data centers, a set of data residency regulations, a deployment cost between web services and data centers, invocation frequency between user centers and web services, latency between user centers and data centers, and predefined service level agreement (SLA) for latency of each web service. Further, the processor-implemented method comprising analyzing the allocation of each of the one or more user centers and each of the one or more web services to one or more data centers to identify a non-compliance to the set of data residency regulations and a change in a predefined latency threshold for web services based on one or more user demands.

Furthermore, the processor-implemented method is comprising determining an impact on the one or more user centers and on the one or more web services based on the non-compliance to the set of data residency regulations and the change in a predefined latency threshold for web services based on one or more user demands. Further, the processor-implemented method identifying at least one of the one or more data centers which are compliant to the data residency regulations and compliant with the predefined latency threshold for web services based on one or more user demands and migrating either the impacted one or more user centers, or the impacted one or more web services to the identified at least one of the one or more compliant data centers. Finally, the processor-implemented method comprising minimizing number of migrations of the one or more user centers and the one or more web services based on an invocation frequency, a deployment latency, and a cost of deployment, wherein an increase in the invocation frequency increases the deployment latency for the one or more web services.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
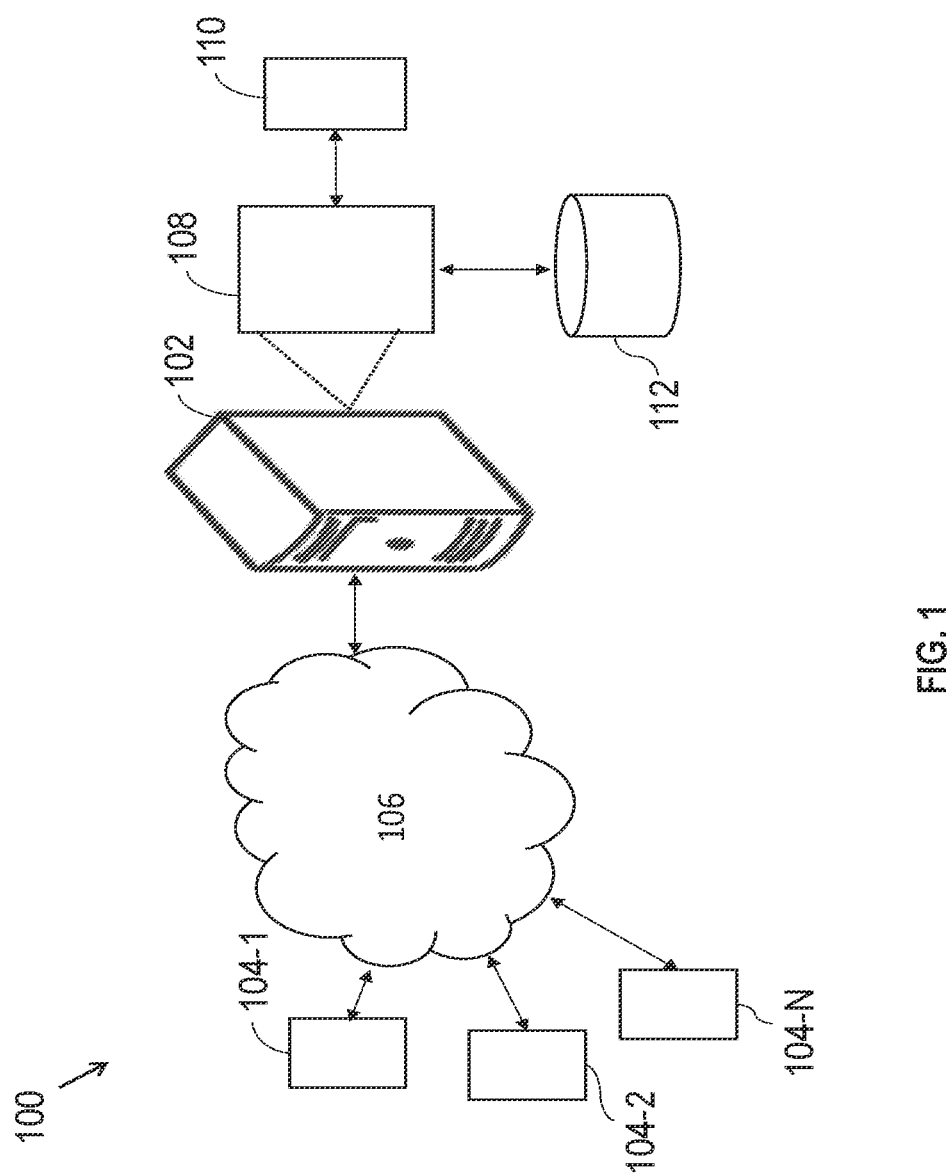
FIG. 1 illustrates a block diagram of an exemplary system for minimizing migration of user centers as well as web services to data center to comply with data residency regulations and quality of service, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Enterprise needs to deploy several web services at multiple data centers to serve their customers satisfactorily. The selection of web service locations to serve geographically distributed customers significantly impacts Quality of service (QOS). Deploying a web service closer to each data subjects (user centers) improves the service response time, however hosting web services at multiple locations increases operational cost. The problem of locating multiple web services and user centers at different data centers with minimum deployment cost and ensuring low network latency, is referred as Web Service Location Allocation Problem (WSLAP). The WSLAP is a challenging combinatorial multi-objective optimization problem.

In an example, consider an enterprise, wherein multiple web services are hosted by a service provider at different data center locations to efficiently serve the geographically distributed users of the enterprise. For hosting these web services at multiple data centers, the enterprise has incurred total deployment cost of C* for an initial web services location-allocation configuration ($y_{ijk}^*$) and the latency criteria for each web service is met. With the new upcoming data regulations imposed by some countries, enterprise needs to re-evaluate its existing allocation. The current allocation ($y_{ijk}^*$) may not be data residency compliant. The enterprise may need to repair (reconfigure) the initial allocation. The task for the enterprise is to migrate non-compliant user centers from its current allocated data center to other data center to make the solution DR compliant. The re-allocation must be within permissible deployment cost and latency requirements.

However, while re-allocation, it might be possible to significantly reduce the overall operational cost with large number of migrations across the user centers and web services hosting. The enterprise may prefer minimal migrations over large migrations, because making drastic changes from the original setup could involve other operational overheads. Further, achieving minimal migrations might not also be feasible, due to other criteria of latency requirements. Hence, it is challenging to determine the best migrations such that overall deployment cost and latency criteria are met, and overall deviations are minimal. In practice, the number of users of an enterprise, web services offered by it, and the number of data centers could be large. Hence, the number of possibilities for migrating user centers and web services from its current configuration could be humongous. The WSLAP-Repair problem is to find a new location-allocation for user centers and web services with the goal of minimal perturbations (migrations) from the original solution, such that new solution is within permitted deployment cost and network latency requirements.

The embodiments herein provide a method for minimizing migration of user centers as well as web services to data center to comply with data residency (DR) regulations and quality of service (QOS), in accordance with some embodiments of the present disclosure. The method and system provide a framework that assists enterprises in migrating web services and user allocation to different data centers with minimal changes and with lower additional operational cost. In case of change in data regulations, non-compliant users are allocated to compliant data centers with minimal changes in the original configuration. Though the key decision is to serve the customers effectively, web services need to be deployed across a finite number of servers, there are multiple sub-problems such as minimizing latency that needs to be addressed.

Referring now to the drawings, and more particularly to FIG. 1 through FIG. 10?, where similar reference characters denote corresponding features consistently throughout the figures, there are shown preferred embodiments and these embodiments are described in the context of the following exemplary system and/or method.

FIG. 1 illustrates a block diagram of a system 100 for minimizing migration of one or more user centers and web services, in accordance with an example embodiment. Although the present disclosure is explained considering that the system 100 is implemented on a server, it may be understood that the system 100 may comprise one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 supports various connectivity options such as BLUETOOTH®, USB, ZigBee, and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. Further, the system 100 comprises at least one memory with a plurality of instructions, one or more databases 112, and one or more hardware processors 108 which are communicatively coupled with the at least one memory to execute a plurality of modules 114 therein. The components and functionalities of the system 100 are described further in detail.

Figure 2:
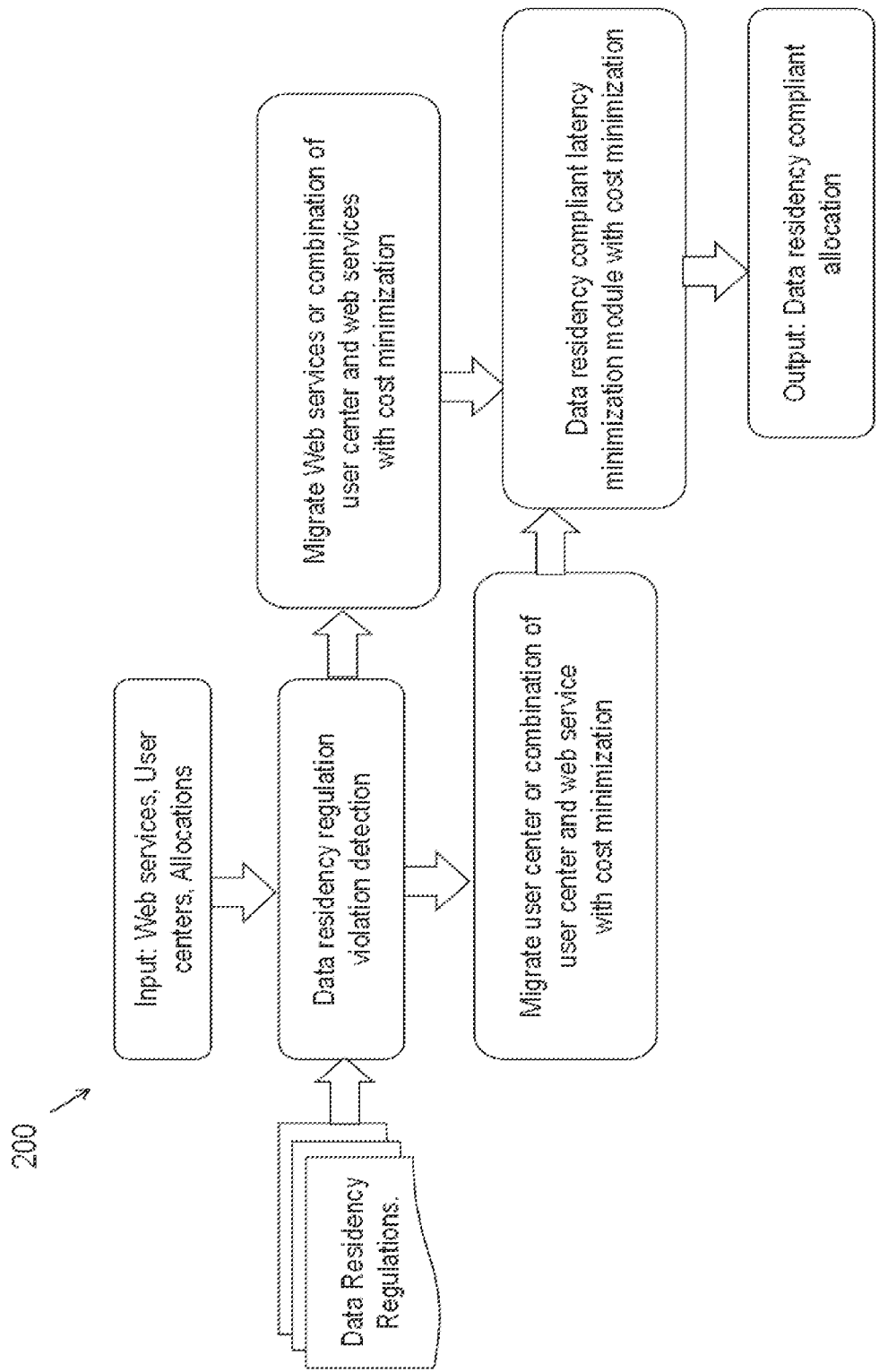
FIG. 2 is a functional block diagram of the system for Web Service Location Allocation Problem (WSLAP)-Repair on change in data residency regulation using FIG. 1, in accordance with some embodiments of the present disclosure.

FIG. 2 is a functional block diagram of the system 100 for Web Service Location Allocation Problem (WSLAP)-Repair on change in data residency regulation using FIG. 1, in accordance with some embodiments of the present disclosure. The non-compliance in any existing configuration can be triggered due to change in data residency (DR) laws in countries (which make some of the existing allocation DR non-compliant) or due to change in user demands resulting in increased invocation frequency and possible violation of quality of service (QOS). To tackle change in DR regulations, obtaining the set of violations, migrating allocation of user centers or deployment of web services while ensuring minimal cost and latency helps to comprehensively repair existing non-compliant allocations. Increase in the invocation frequency increases overall deployment latency for web services.

In such a case the web service needs to be deployed in data centers which are closer to the user centers. A non-compliance detection module of the system 100 helps to detect non-compliant allocations due to change in DR regulations or change in deployment latency of web services. If DR non-compliant allocations are obtained, then decision for migrating allocation of user centers or deployment of web services are made based on a novel search technique. The modules of the system 100 for migration of user center or web service helps in migration to compliant data centers depending on the decision made earlier.

The modules of the system 100 for migration of one or more user centers or one or more web services also try to minimize costs during repair which reduces the search space for obtaining compliant data centers and generate compliant allocations in short durations. Latency of web service might violate latency constraints in two cases: (i) migrations of user center allocations and web service deployment to repair data residency non-compliance leads to increase in latency, (ii) changes in invocation frequency of some user centers leads higher deployment latency for web service at data centers. The latency minimization module helps to minimize deployment latency for web services by looking for data centers having lower latency with user centers. Finally, the repaired solution with latency minimization is generated as output.

Figure 3:
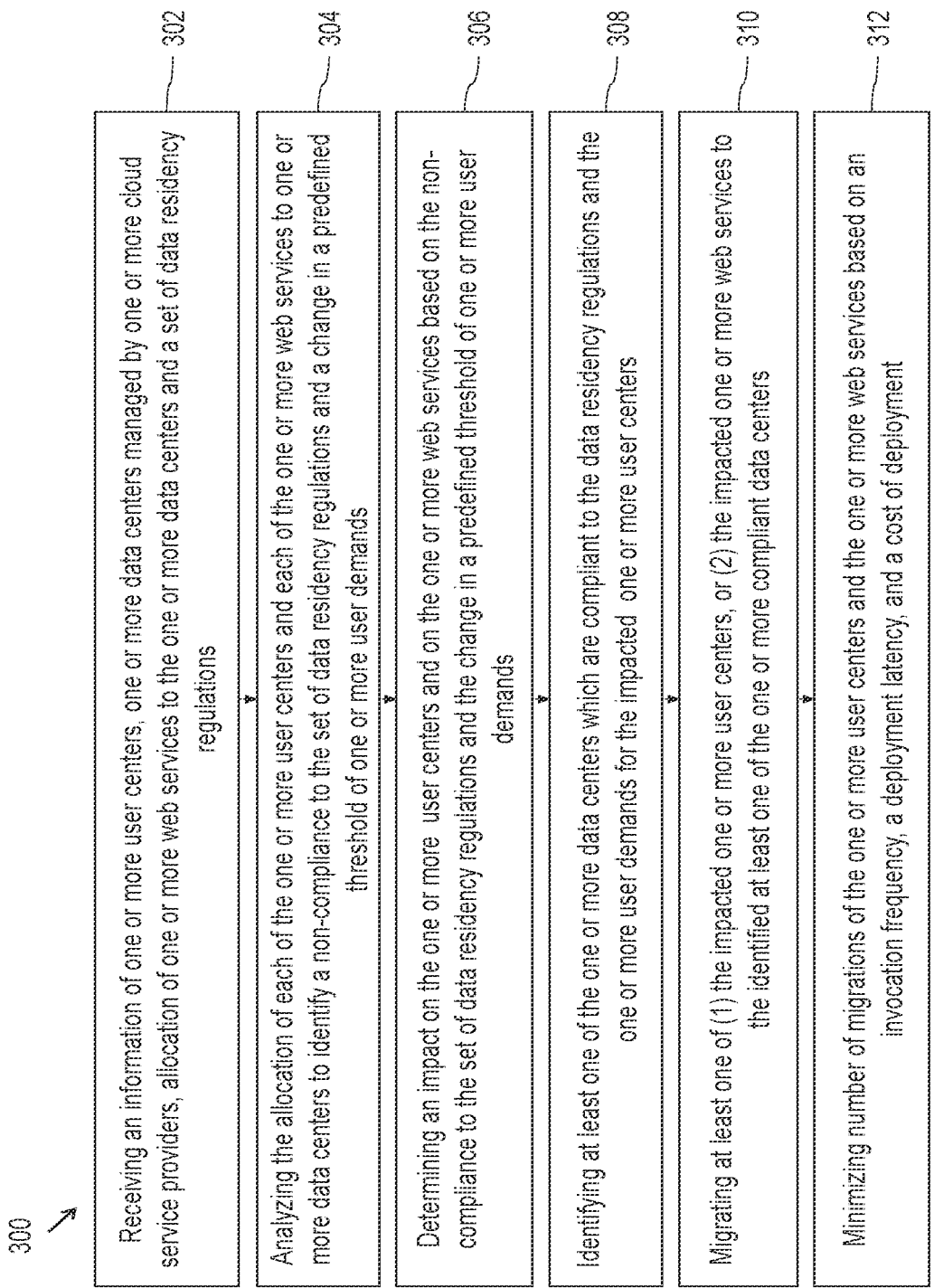
FIG. 3 is a functional block diagram to illustrate a method for minimizing migration of user centers as well as web services to data center to comply with data residency regulations and quality of service, in accordance with some embodiments of the present disclosure.

FIG. 3 is an exemplary flow diagram illustrating a processor-implemented method 300 for minimizing migration of user centers as well as web services to data center to comply with data residency regulations and quality of service implemented by the system of FIG. 1. Functions of the components of the system 100 are now explained with reference to FIG. 2 through steps of flow diagram in FIG. 3, according to some embodiments of the present disclosure.

Initially at step 302 of the method 300, an information of one or more user centers, one or more data centers managed by one or more cloud service providers, allocation of one or more web services to the one or more data centers, a set of data residency regulations, a deployment cost between web services and data centers, invocation frequency between user centers and web services, latency between user centers and data centers, and predefined service level agreement (SLA) for latency of each web service is received, via an input/output interface 104, as an input.

At the next step 304 of the method 300, the one or more hardware processors 108 are configured by the programmed instructions to analyze the allocation of each of the one or more user centers and each of the one or more web services to one or more data centers to identify a non-compliance to the set of data residency regulations and a change in a predefined latency threshold for web services based on one or more user demands.

In one embodiment, wherein the WSLAP-Repair is to find a new location-allocation for user centers and web services with the goal of minimal perturbations (migrations) from the original solution, such that new solution is within permitted deployment cost and network latency requirements. Herein, decision variables for the WSLAP-Repair model are $x_{kj}=1$, if web service (k) is deployed at data center (j), otherwise 0 and $y_{ijk}=1$, if user center (i) uses data center (j) for the one or more web services (k).

$$\text{minimize} \frac{1}{2} \sum_{i \in U} \sum_{j \in A} \sum_{k \in W} |y_{ijk} - y^*_{ijk}| \quad (1)$$

wherein objective of the equation (1) is to minimize the total number of reallocations (perturbations/migrations). The reallocations are computed as the difference between the current allocation and the new (repaired) allocation. The current configuration $y_{ijk}^*$ states, allocation of user (i) to the data center (j) and accessing the web service (k).

In another embodiment, wherein if the initial allocation $y_{ijk}^*=1$, a particular user center (i) was allocated to data center (j) and accessing the web service (k). Now, due to change in data regulations at a user center location, the user (i) cannot host its data, at data center location (j). Therefore, the pair (i, k) becomes non-compliant, and user center (i) must be migrated from data center (j) to other data center (j') in the new solution, for compliance. In the prior allocation $y_{ijk}^*=1$ and $y_{ij'k}^*=0$ and in the new allocation, it must be $y_{ijk}=0$ and $y_{ij'k}^*=1$. The number of reallocations counted by the objective function would be two, for a single change. Hence, in the objective function to avoid recounting, the total reallocations are divided by 2. Following allocation constraints:

$$\sum_{j \in A} x_{kj} \geq 1 \, \forall \, k \in W \quad (2)$$

$$\sum_{i \in U} \sum_{j \in A} y_{ijk} \geq 1 \, \forall \, k \in W \quad (3)$$

$$\sum_{j \in A} y_{ijk} = \omega_{ik} \, \forall \, i \in U \, \& \, k \in W \quad (4)$$

wherein, constraints (2) and (3) ensures that each web service must be deployed at least at one data center. Constraint (4) ensures that every user center (i) using web service (k) must be allocated to exactly one data center (j) if it uses that web service.

At the next step 306 of the method 300, the one or more hardware processors 108 are configured by the programmed instructions to determine an impact on the one or more user centers and on the one or more web services based on the non-compliance to the set of data residency regulations and the change in a predefined latency threshold for web services based on one or more user demands. Herein, the one or more user demands comprising a deployment cost, a latency, and an invocation frequency. It is to be noted that the non-compliance due to change in the user demands results? in an increased invocation frequency and a violation of a predefined quality of service.

Changes in user demand or invocation frequencies mostly require latency minimization for deployed web services in the event of latency constraint violation. This can be obtained by migrating allocation of few user centers depending on which ever migration combination gives optimal results. But change in DR regulations require specific allocation of user centers or deployment of web services to be migrated. This makes it necessary to have separate migration modules apart from the latency minimization module (which also involves migration scenarios).

At the next step 308 of the method 300, the one or more hardware processors 108 are configured by the programmed instructions to identify at least one of the one or more data centers which are compliant to the DR regulations and compliant with the predefined latency threshold for web services based on one or more user demands.

At the next step 310 of the method 300, the one or more hardware processors 108 are configured by the programmed instructions to migrate at least one of (1) the impacted one or more user centers, or (2) the impacted one or more web services to the identified at least one of the one or more compliant data centers.

In case of changing DR regulations, a user center allocated to a data center might become non-compliant or a web service deployment might become non-compliant. A matrix ncomp [U][W] is used to store the detected allocation non-compliance between user centers and web services at data centers. The procedure for non-compliance detected and decisions on migrations is explained as:

1. A non-compliance matrix ncomp is initialized. For each detected non-compliance between user center U and web service Win the existing solution ncomp[U][W] is set to 1. Rest values of ncomp[U][W] are kept 0.
2. For each detected non-compliance ncomp [U] [W]=1, two lists are initialized:

a. List of other web services which are non-compliant with user center at one or more data centers: $n_{web}$ b. List of other user centers which are non-compliant with W at one or more data centers: $n_{user}$ 3. The migration of the user center U or web service W is decided depending on:

a. $n_{web} \geq n_{user}$: user center is to be migrated to compliant data centers b. $n_{web} < n_{user}$: web service W is to be migrated to compliant data centers Whenever migration of user centers occurs from a data center to another data centers in the system, then it might increase the deployment cost. Hence, to accommodate the change in deployment cost a parameter μ is introduced. This represents the allowable percentage increase in deployment cost. It is important to consider an upper bound on increase in cost, otherwise the cost might go very high.

$$\sum_{k \in W} \sum_{j \in A} C_{kj}^d x_{kj} \leq (1 + \mu) * C_d^* \quad (5)$$

wherein equation (5) restricts the change in total deployment cost.

$$\sum_{i \in U} \sum_{j \in A} F_{ik} L_{ij} y_{ijk} \leq \lambda_k \forall k \in W \quad (6)$$

wherein equation (6) restricts the network latency by keeping an upper bound on latency for each web service (k). The bound-on latency is decided by the enterprise based on SLAs.

$$y_{ijk} \leq \beta_{ijk} \forall i \in U, j \in A \& k \in W \quad (7)$$

wherein, the equation (7) ensures that the data residency regulations are met. It does not permit the user (i) to be allocated to a data center location for accessing web service (k), where data transfer is prohibited by the country of that user.

$$y_{ijk} \leq x_{kj} \forall i \in U, j \in A \& k \in W \quad (8)$$

wherein, the equation (8) establishes a relationship between the decision variables $x_{kj}$ and $y_{ijk}$ of the model. It ensures that user center (i) can be allocated to data center (j) for using web service (k), only if web service (k) is deployed at data center (j).

Figure 4:
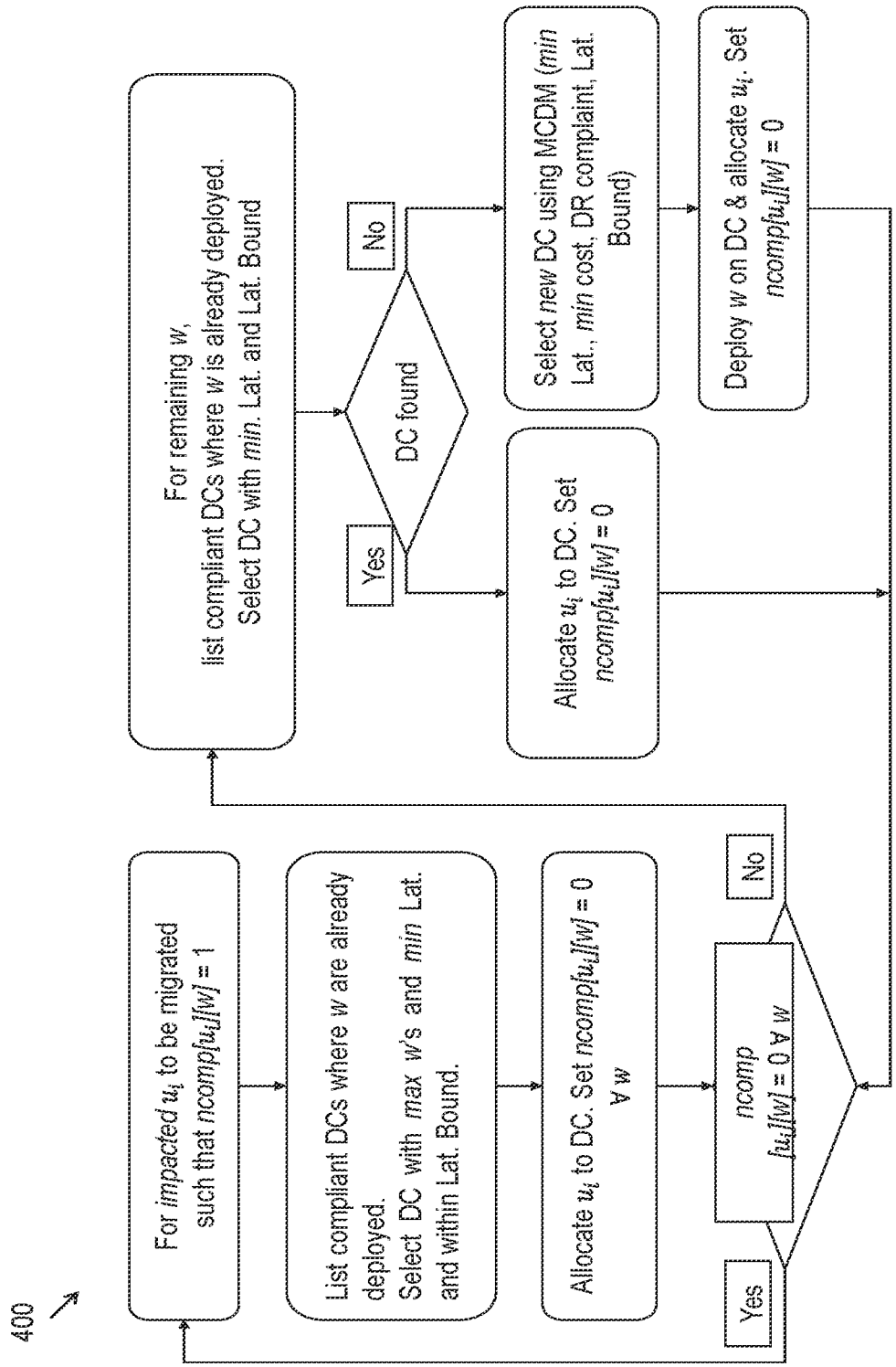
FIG. 4 is a flow diagram to illustrate a user center migration, in accordance with some embodiments of the present disclosure.

FIG. 4 is a flow diagram 400 to illustrate a user center migration, in accordance with some embodiments of the present disclosure. The user center and the list of non-compliant web services ($n_{web}$) at one or more data centers is obtained. A list of compliant data centers is obtained where maximum of the $n_{web}$ web services are already deployed to serve other user centers. The allocation of user center is migrated to the data center which gives minimum latency. For each of the remaining web services, the allocation of the one or more user centers is migrated to a compliant data center having the web service already deployed and gives minimum increase in latency. If none of the other compliant data centers have the web service deployed, then the web service is deployed to a compliant data center which would give minimum cost and latency on allocating the user center.

Due to change in data residency regulations in one or more countries, a web service deployed at a data center to serve one or more user centers might become non-compliant. The deployment of the one or more web services which becomes data residency non-compliant with $n_{user}$ user centers at one or more data centers require to be migrated to the compliant data centers where the user centers are already allocated or need to be re-allocated with minimum cost and latency. The allocation strategies for web service can be (i) full allocation, (ii) max allocation, (iii) fixed allocation, which works in the same way as the user center allocation migration strategies with the roles of user center and web service being interchanged during migration.

Figure 5:
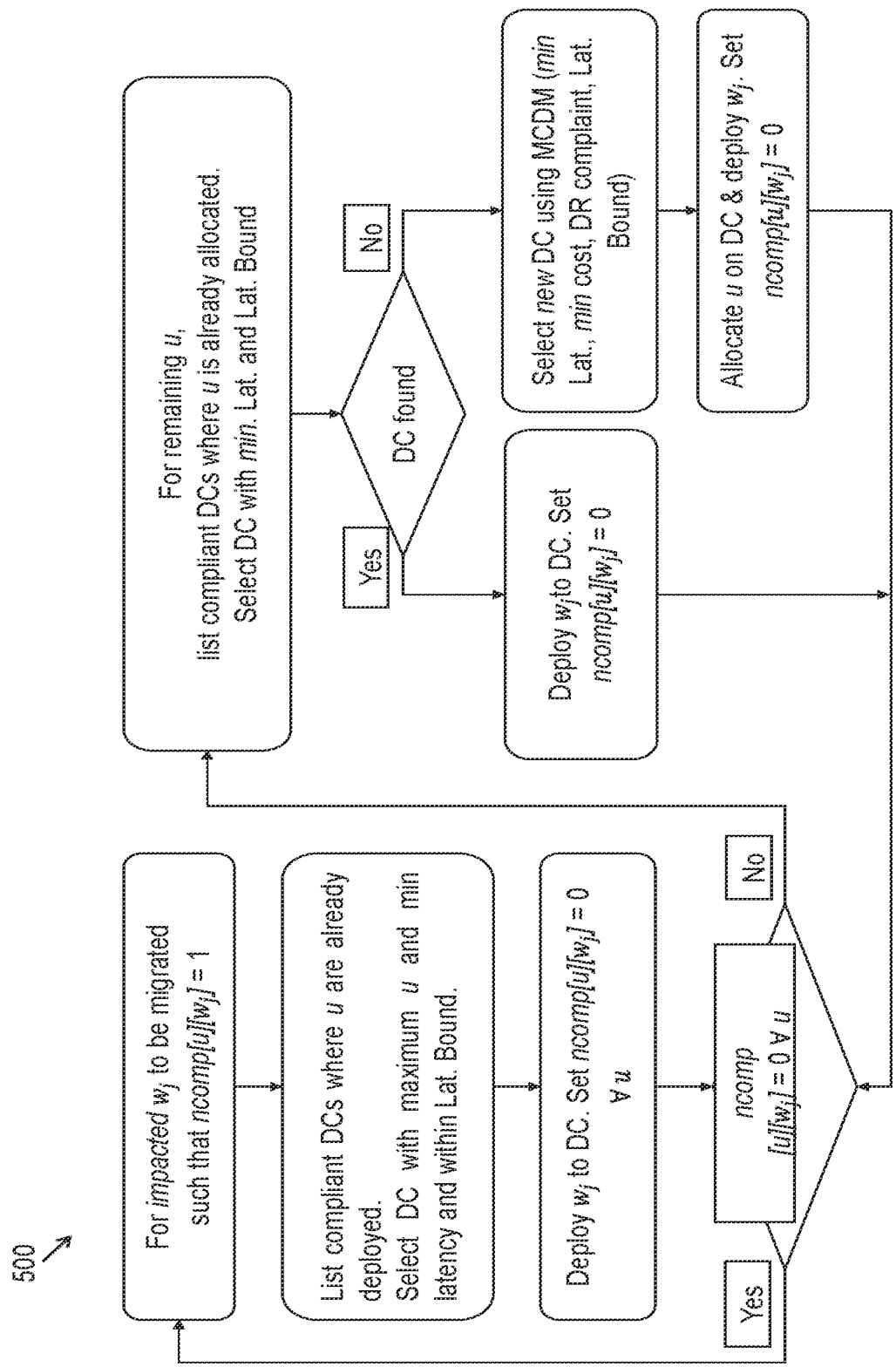
FIG. 5 is flow diagram to illustrate a web service migration, in accordance with some embodiments of the present disclosure.

FIG. 5 is flow diagram 500 to illustrate a web service migration, in accordance with some embodiments of the present disclosure. Wherein, the one or more web services, the list of non-compliant user centers ($n_{user}$) and one or more data centers is obtained. A list of compliant data centers is also obtained where maximum of the $n_{user}$ user centers are already allocated for accessing other web services. The deployment of web services is migrated to the data center which gives minimum cost and latency. For each of the remaining user centers, the deployment of web service is migrated to a compliant data center having the user center already deployed and gives minimum cost and latency. If none of the other compliant data centers have the user center allocated, then the user center is allocated to a compliant data center which would give minimum cost and latency on deploying the web service.

Figure 6:
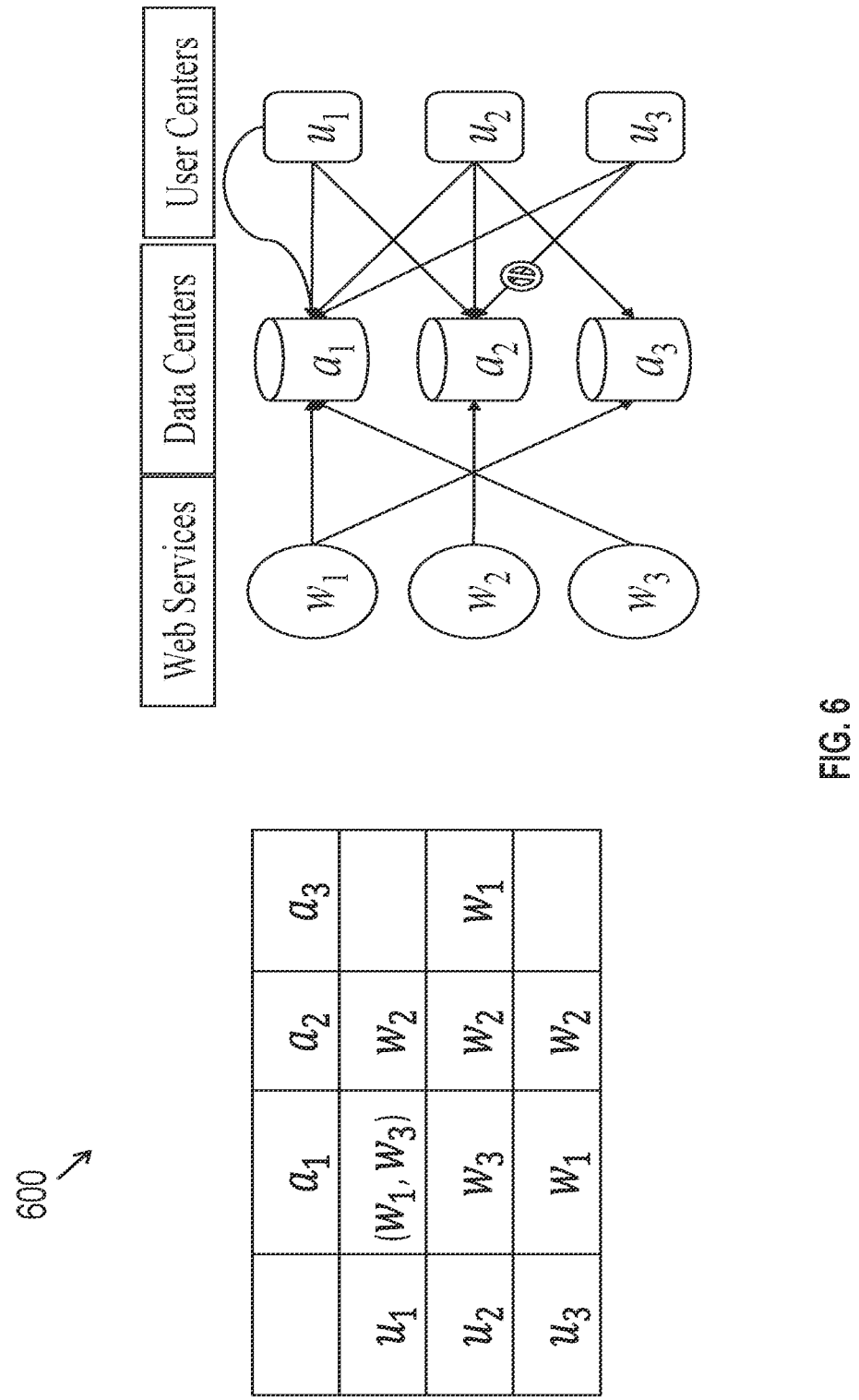
FIG. 6 through FIG. 9 are schematic diagrams to determine a data residency matrix based on user center location, data type of the web services, and cloud data center location, in accordance with some embodiments of the present disclosure.

FIG. 6 through FIG. 9, as an example, are schematic diagrams to determine a data residency matrix based on user center location, data type of the web services, and cloud data center location, in accordance with some embodiments of the present disclosure. FIG. 6, current web services location allocation problem configuration, where a web service provider has deployed three web services ($w_1$, $w_2$, $w_3$) on three data centers ($a_1$, $a_2$, $a_3$) for its three user centers ($u_1$, $u_2$, $u_3$). Further, the input data set comprises of the invocation frequency, the latency, and the deployment cost matrices. The latency (λ) for the web services is computed as:

$$\sum_{i \in U} \sum_{j \in A} F_{ik} L_{ij} = \lambda_k \forall k \in W \quad (9)$$

wherein $f_{ik}$ is the invocation frequency at $i^{th}$ user center for $k^{th}$ web service. And $L_{ij}$ is the latency between $i^{th}$ user center and $j^{th}$ data center.

However, over the period, certain changes in data regulations have occurred at user center ($u_3$) locations. Henceforth, with the new data regulation at user center location, the current configuration ($u_3 \rightarrow w_2 \rightarrow a_2$) of hosting web service $w_2$ for user center $u_3$ on data center $a_2$ becomes non-compliant.

Figure 7:
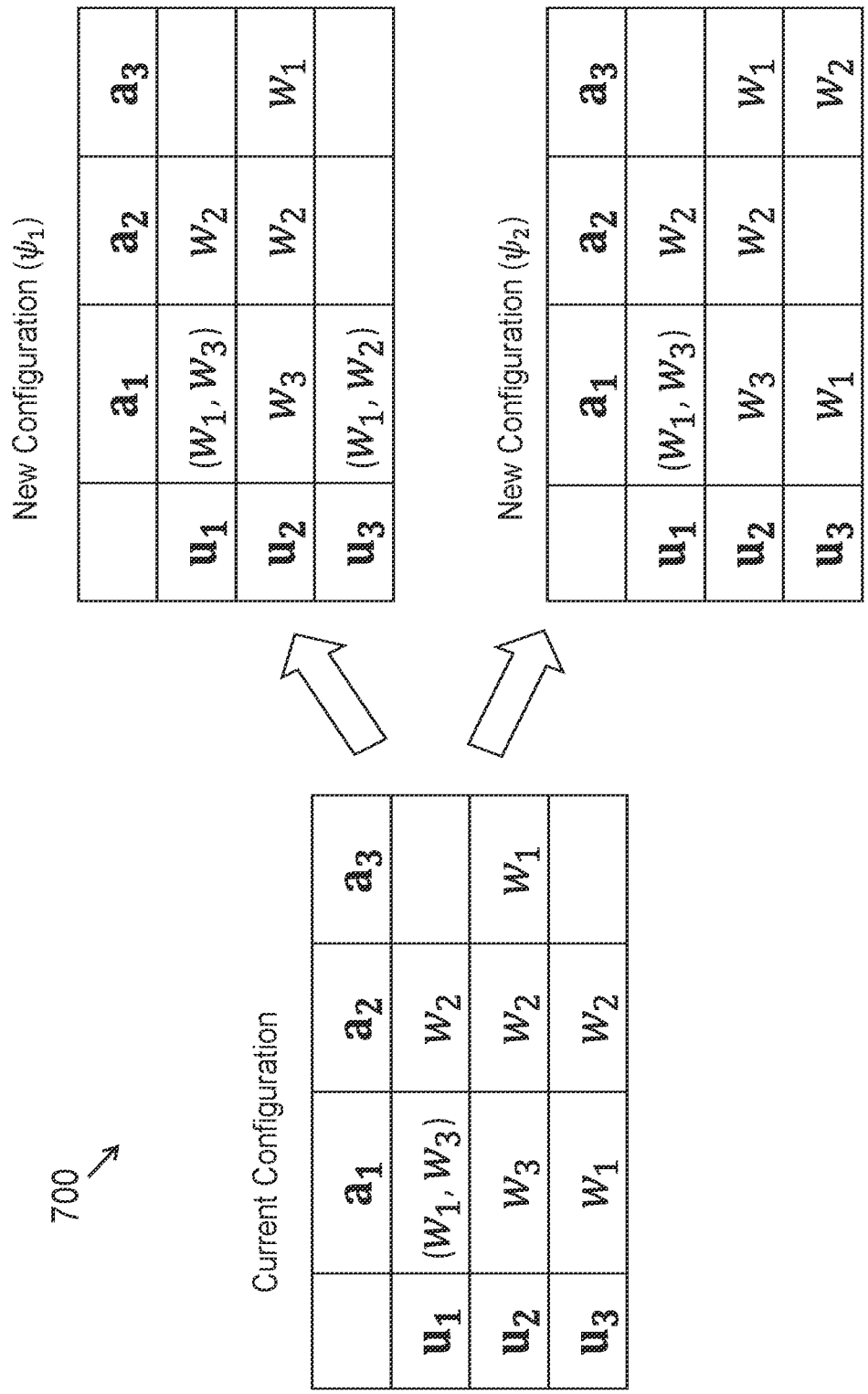

In one scenario, to make the configuration compliant migrating user center $u_3$ as shown in FIG. 7. Herein, the non-compliant user centers from its currently allocated data centers are migrated to other compliant data centers. The user center $u_3$ must be migrated from data center $a_2$ to some other data center for using web service $w_2$. The available options for migration are $a_1$ and as data centers. If the user center $u_3$ is migrated from data center $a_2$ to a then the latency for the web service $w_2$ is represented by $\lambda_{w_2}(\psi_1)$ and if the user center $u_3$ is migrated from data center $a_2$ to $a_3$, then the latency for the web service is represented by $w_2$ is $\lambda_{w_2}(\psi_2)$ However, both the allocation configurations $\psi_1$ and $\psi_2$ might violate the latency criteria for the web service $w_2$. Hence migrating only, the non-compliant pairs is not enough.

Figure 8:
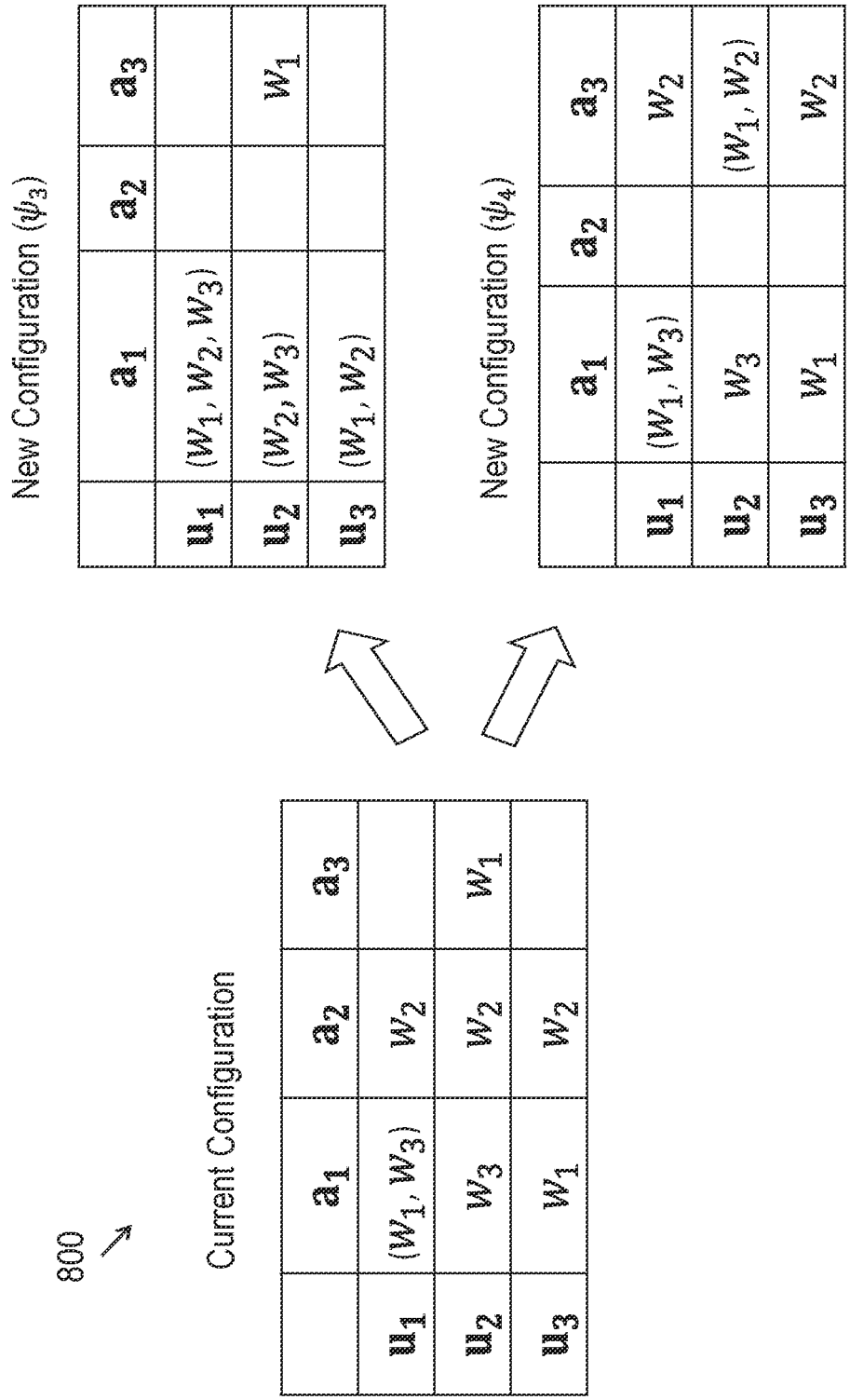

In another scenario, to make the configuration compliant migrating web service $w_2$ as shown in FIG. 8. Wherein web services from its currently deployed data center are migrated to other data center. It is to be noted that the deploying the web services on new data centers would incur higher cost, compared to hosting on the already rented data centers. Therefore, the system 100 migrates web service $w_2$ from data center $a_2$ to either $a_1$ or $a_3$. For migration of web service $w_2$ from data center $a_2$ to $a_1$, the latency for web service $w_2$, is represented by $\lambda_{w_2}(\psi_3)$ and for the migration of the web service $w_2$ from data center $a_2$ to $a_3$, then latency for web service $w_2$, is represented by $\lambda_{w_2}(\psi_4)$. However, both the allocations $\psi_3$ and $\psi_4$ might also violative of the latency constraint for web service $w_2$. Hence migrating only, the web services is not enough.

Figure 9:
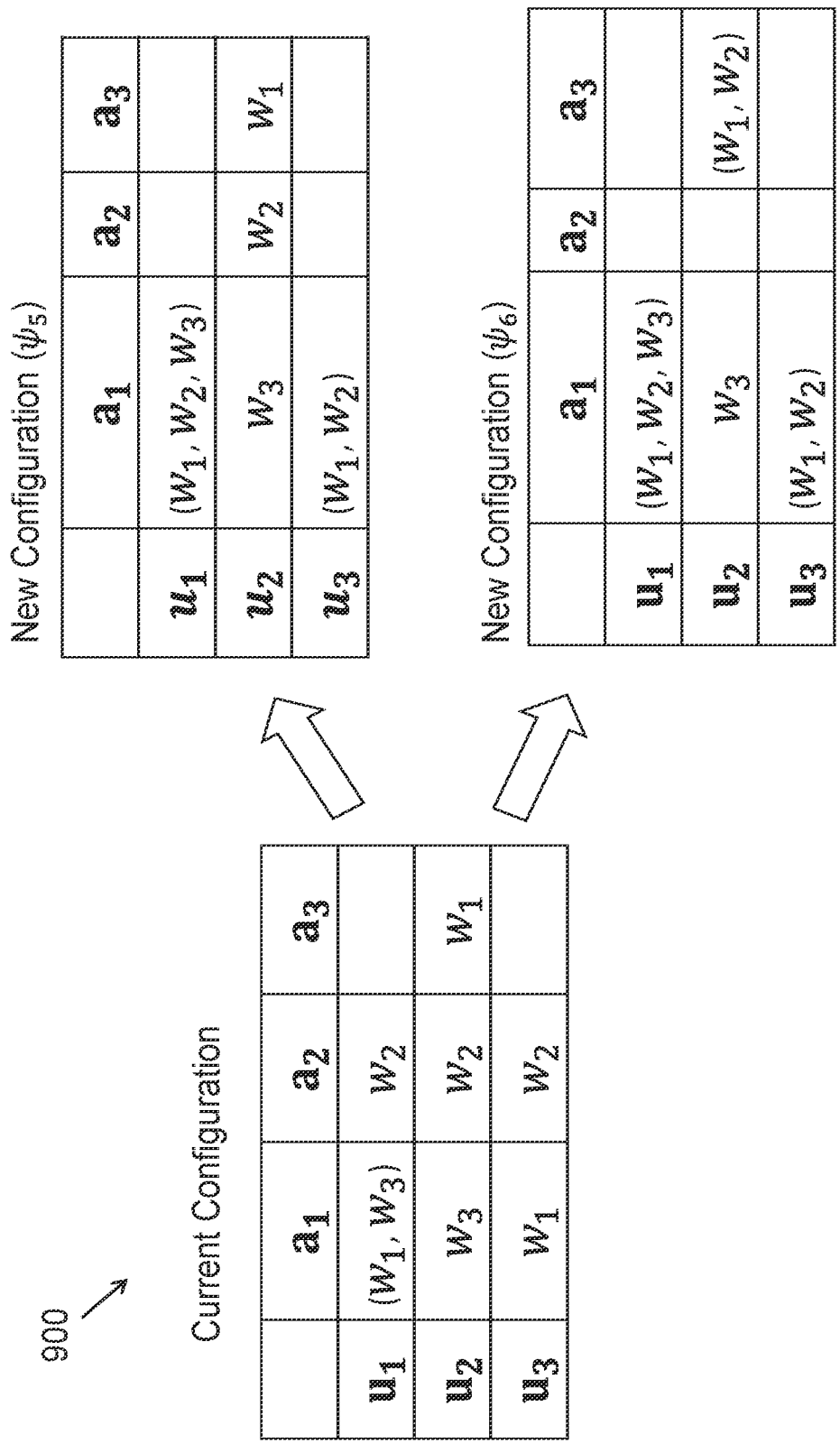

In yet another scenario, to make a combination of web services configuration compliant, and compliant and non-compliant user centers from its current data center are migrated to other data centers as shown in FIG. 9. The possible combinations for migrating web service at data centers are $(a_1, a_2)$, $(a_1, a_3)$, $(a_2, a_3)$ and $(a_1, a_2, a_3)$. The purpose of choosing the combination is to seek reduction in the overall latency for web service $w_2$. It would be appreciated that if web service $w_2$ is deployed at data centers $a_1$ and $a_2$, with latency for web service $w_2$, is represented by $\psi_{w_2}(\psi_5)$, and if web service $w_2$ is deployed at data centers $a_1$ and $a_3$, then latency for web service $w_2$, is represented by $\lambda_{w_2}(\psi_6)$. If the latency for web service $w_2$ remains within the specified limit for the configurations $5 and $\psi_6$, then these become the feasible configurations.

At the next step 312 of the method 300, the one or more hardware processors 108 are configured by the programmed instructions to minimize number of migrations of the one or more user centers and the one or more web services based on an invocation frequency, a deployment latency, and a cost of deployment. Wherein an increase in the invocation frequency increases the deployment latency for the one or more web services. A web service can be accessed by several user centers at one or more than one data center.

A latency minimization module of the system 100 is used to minimize the deployment latency for the one or more web services in the event of (i) increase in web service latency and latency constraint violation for web service due to migrations, and (ii) latency constraint violation for web service due to increase in invocation frequency.

Figure 10:
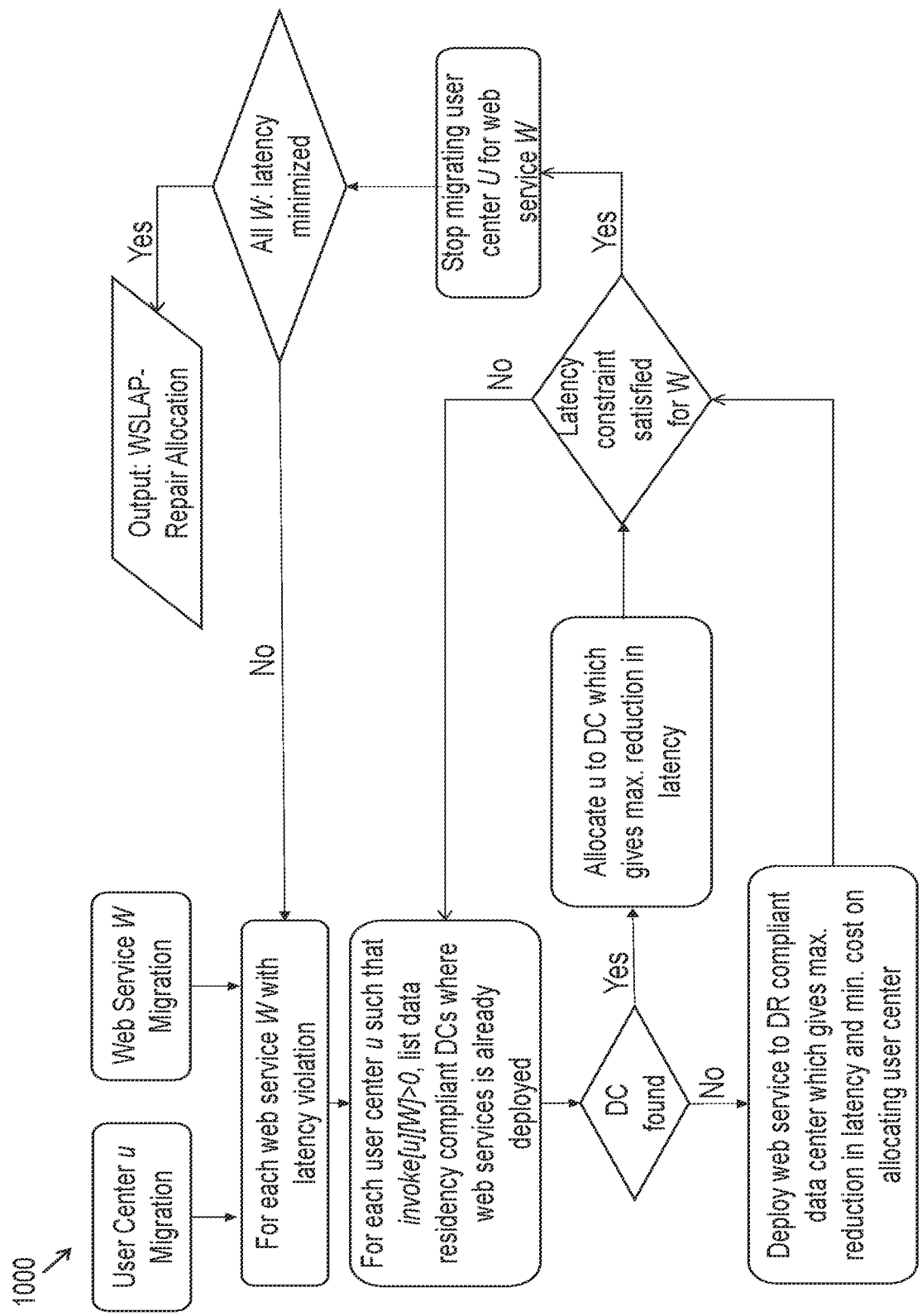
FIG. 10 is a flow diagram to illustrate a latency minimization, in accordance with some embodiments of the present disclosure.

FIG. 10 is a flow diagram 1000 to illustrate a latency minimization, in accordance with some embodiments of the present disclosure. To minimize the deployment latency of the one or more web services, allocation of user centers needs to be migrated to other compliant data centers having lower latency as the invocation frequency of a user center cannot be compromised. The one or more web services can be deployed at more than one data centers. The allocation of the one or more user centers at the data centers accessing the web service need to be migrated to another compliant data center where the web service is deployed and gives maximum reduction in latency. This strategy is repeated for user centers accessing the web service until the deployment latency satisfies the latency constraint.

In another example, wherein primary goal is having minimal migrations to accommodate the changes in data regulation, then the total cost could be high. On the other hand, if the primary goal is cost minimization, than it could lead to larger migration. The reason being, earlier web services and user centers are located and allocated to the nearest data center, for better quality of service, which could be a costlier deployment. Initially the deviations are minimum, and the total cost is higher. As the bound on the cost gets tighter, the migrations are larger.

Experiment: Table 1 demonstrates the results for two problem instances: P(50-10-10) and P(75-12-15), considering four test cases of each. The change in data regulations.

TABLE 1

| DR Change (%) | Test Case | Number of Deviations | | | Change (%) | |
|---|---|---|---|---|---|---|
| | | Min | WSLAP | WSLAP-Repair | Cost | Latency |
| Problem Instance: P(50-10-10) | | | | | | |
| 2.5 | 1 | 4 | 35 | 4 | 19.44 | 1.22 |
| | 2 | 10 | 76 | 12 | 15.57 | 0.47 |
| | 3 | 3 | 35 | 5 | 9.88 | 0.14 |
| | 4 | 9 | 104 | 10 | 21.85 | 0.26 |
| 5.0 | 1 | 9 | 39 | 9 | 20.05 | 0.72 |
| | 2 | 15 | 87 | 17 | 20.15 | 2.09 |
| | 3 | 7 | 51 | 9 | 13.53 | 2.2 |
| | 4 | 15 | 113 | 16 | 28.01 | 1.48 |
| Problem Instance: P(75-12-15) | | | | | | |
| 2.5 | 1 | 7 | 91 | 7 | 10.16 | −0.22 |
| | 2 | 15 | 133 | 15 | 15.84 | 3.35 |
| | 3 | 8 | 74 | 8 | 8.70 | 1.05 |
| | 4 | 11 | 76 | 12 | 9.83 | 1.19 |
| 5.0 | 1 | 13 | 115 | 14 | 15.78 | −0.09 |
| | 2 | 23 | 221 | 23 | 32.36 | 2.25 |
| | 3 | 16 | 120 | 17 | 17.05 | 2.08 |
| | 4 | 19 | 144 | 20 | 21.23 | −0.21 |

The description of the columns of the table 1 is as follows: Under 'Number of Deviations' column header, there are three cases:
  a. 'Min': minimum required reallocations to be compliant. It is the count of the non-compliant edges (u, a, Wk) in the current solution.
  b. 'WSLAP': is the number of reallocations when WSLAP is solved from scratch considering DR regulations.
  c. 'WSLAP-Repair': actual number of reallocations with WSLAP-Repair optimization model, considering objective (1) value of the repair model.

The column 'Change (%)' gives the percentage increase in cost and latency. The comparison of WSLAP-Repair solution is done with the current (i.e., prior) solution. Table 1 shows the implications of data regulation change on WSLAP. If the problem is solved from scratch to obtain the compliant solution, the number of reallocations is very large. While with WSLAP-Repair model, the reallocations are minimal. Note, large reallocations (migration) could incur additional overheads, hence enterprises could opt for WSLAP-Repair strategy.

In the problem instance P(50-10-10), when percentage change in regulations is 5%, for test case 2, results states that minimum 15 reallocations are required to make the solution compliant, while WSLAP-Repair suggests that 17 reallocations are necessary. As stated earlier, many-a-times desired minimal reallocations are not feasible, due to other criteria (latency requirements). If this is solved from scratch, then the number of reallocations is 87 which is quite large. With significantly lower number of reallocations and little additional cost, the enterprises could be data residency compliant. It is observed that in some of the cases, latency decreases as there exists multiple feasible Pareto-optimal solutions for the problem.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the need of minimizing migration of user centers and web services to comply with data residency regulations and change in latency threshold for web services based on user demands. The method and system provide a framework that assists enterprises in migrating web services and user allocation to different data centers with minimal changes and with lower additional operational cost. In case of change in data regulations, non-compliant users are allocated to compliant data centers with minimal changes in the original configuration. Though the key decision is to serve the customers effectively, web services need to be deployed across a finite number of servers, there are multiple sub-problems such as minimizing latency that needs to be addressed.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method comprising:
  receiving, via an input/output interface, an information of one or more user centers, one or more data centers managed by one or more cloud service providers, allocation of one or more web services to the one or more data centers, a set of data residency regulations, a deployment cost between the one or more web services and the one or more data centers, an invocation frequency between the one or more user centers and the one or more web services, a latency between the one or more user centers and the one or more data centers, and a predefined service level agreement (SLA) for the latency of each of the one or more web services;
  analyzing, via the one or more hardware processors, the allocation of each of the one or more user centers and each of the one or more web services to one or more data centers to identify a non-compliance to the set of data residency regulations and a change in a predefined latency threshold for web services based on one or more user demands;
  determining, via the one or more hardware processors, an impact on the one or more user centers and on the one or more web services based on the non-compliance to the set of data residency regulations and the change in the predefined latency threshold for each of the one or more web services based on the one or more user demands;
  identifying, via the one or more hardware processors, at least one of the one or more data centers which is compliant to the data residency regulations and compliant with the predefined latency threshold for web services based on the one or more user demands;
  migrating, via the one or more hardware processors, at least one of (a) the impacted one or more user centers, or (b) the impacted one or more web services to the identified at least one of the one or more compliant data centers; and minimizing, via the one or more hardware processors, number of migrations of the one or more user centers and the one or more web services based on the invocation frequency, the latency, and the deployment cost, wherein an increase in the invocation frequency increases the latency for the one or more web services.

2. The processor-implemented method of claim 1, wherein each of the one or more user centers are allocated to at least one of the one or more data centers according the to the set of data residency regulations.

3. The processor-implemented method of claim 1, wherein the non-compliance due to change in the user demands results in an increased invocation frequency and a violation of a predefined quality of service (QOS).

4. The processor-implemented method of claim 1, wherein migrating the one or more non-compliant user centers to one or more compliant data centers is performed by considering a number of already deployed web services to the data center, a predefined optimum quality of service and the deployment cost.

5. The processor-implemented method of claim 1, wherein migrating the one or more non-compliant web services to one or more compliant data centers is performed by considering a number of already allocated user centers to the data center, a predefined optimum quality of service and the deployment cost.

6. The processor-implemented method of claim 1, wherein minimization of the latency of the one or more web services is achieved by migrating the one or more user centers to the one or more compliant data centers such that increase in deployment cost is minimal and latency is low.

7. A system comprising:
an input/output interface to receive an information of one or more user centers, one or more data centers managed by one or more cloud service providers, allocation of one or more web services to the one or more data centers, a set of data residency regulations, a deployment cost between the one or more web services and the one or more data centers, an invocation frequency between the one or more user centers and the one or more web services, a latency between the one or more user centers and the one or more data centers, and a predefined service level agreement (SLA) for the latency of each of the one or more web services;
a memory in communication with the one or more hardware processors, wherein the one or more hardware processors are configured to execute programmed instructions stored in the memory to:
analyze the allocation of each of the one or more user centers and each of the one or more web services to one or more data centers to identify a non-compliance to the set of data residency regulations and a change in a predefined latency threshold for web services based on one or more user demands;
determine an impact on the one or more user centers and on the one or more web services based on the non-compliance to the set of data residency regulations and the change in the predefined latency threshold for each of the one or more web services based on the one or more user demands;
identify at least one of the one or more data centers which is compliant to the data residency regulations and compliant with the predefined latency threshold for web services based on the one or more user demands; migrate at least one of (a) the impacted one or more user centers, or (b) the impacted one or more web services to the identified at least one of the one or more compliant data centers; and minimize number of migrations of the one or more user centers and the one or more web services based on the invocation frequency, the latency, and the deployment cost, wherein an increase in the invocation frequency increases the latency for the one or more web services.

8. The system of claim 7, wherein each of the one or more user centers are allocated to at least one of the one or more data centers according the to the set of data residency regulations.

9. The system of claim 7, wherein the non-compliance due to change in the user demands results in an increased invocation frequency and a violation of a predefined quality of service (QOS).

10. The system of claim 7, wherein migrating the one or more non-compliant user centers to one or more compliant data centers is performed by considering a number of already deployed web services to the data center, a predefined optimum quality of service and the deployment cost.

11. The system of claim 7, wherein migrating the one or more non-compliant web services to one or more compliant data centers is performed by considering a number of already allocated user centers to the data center, a predefined optimum quality of service and the deployment cost.

12. The system of claim 7, wherein minimization of the latency of the one or more web services is achieved by migrating the one or more user centers to the one or more compliant data centers such that increase in deployment cost is minimal and latency is low.

13. One or more non-transitory machine-readable information storage mediums comprising one or more instructions which when executed by one or more hardware processors cause:
receiving, via an input/output interface, an information of one or more user centers, one or more data centers managed by one or more cloud service providers, allocation of one or more web services to the one or more data centers, a set of data residency regulations, a deployment cost between the one or more web services and the one or more data centers, an invocation frequency between the one or more user centers and the one or more web services, a latency between the one or more user centers and the one or more data centers, and a predefined service level agreement (SLA) for the latency of each of the one or more web services;
analyzing the allocation of each of the one or more user centers and each of the one or more web services to one or more data centers to identify a non-compliance to the set of data residency regulations and a change in a predefined latency threshold for web services based on one or more user demands;
determining an impact on the one or more user centers and on the one or more web services based on the non-compliance to the set of data residency regulations and the change in the predefined latency threshold for each of the one or more web services based on the one or more user demands;
identifying at least one of the one or more data centers which is compliant to the data residency regulations and compliant with the predefined latency threshold for web services based on the one or more user demands;
migrating at least one of (a) the impacted one or more user centers, or (b) the impacted one or more web services to the identified at least one of the one or more compliant data centers; and minimizing number of migrations of the one or more user centers and the one or more web services based on the invocation frequency, the latency, and the deployment cost, wherein an increase in the invocation frequency increases the latency for the one or more web services.

14. The one or more non-transitory machine-readable information storage mediums of claim 13, wherein each of the one or more user centers are allocated to at least one of the one or more data centers according the to the set of data residency regulations.

15. The one or more non-transitory machine-readable information storage mediums of claim 13, wherein the non-compliance due to change in the user demands results in an increased invocation frequency and a violation of a predefined quality of service (QOS).

16. The one or more non-transitory machine-readable information storage mediums of claim 13, wherein migrating the one or more non-compliant user centers to one or more compliant data centers is performed by considering a number of already deployed web services to the data center, a predefined optimum quality of service and the deployment cost.

17. The one or more non-transitory machine-readable information storage mediums of claim 13, wherein migrating the one or more non-compliant web services to one or more compliant data centers is performed by considering a number of already allocated user centers to the data center, a predefined optimum quality of service and the deployment cost.

18. The one or more non-transitory machine-readable information storage mediums of claim 13, wherein minimization of the latency of the one or more web services is achieved by migrating the one or more user centers to the one or more compliant data centers such that increase in deployment cost is minimal and latency is low.

* * * * *